May 6, 1958  E. J. GROTH, JR  2,833,469
TOTALIZER
Filed April 25, 1955  2 Sheets-Sheet 1
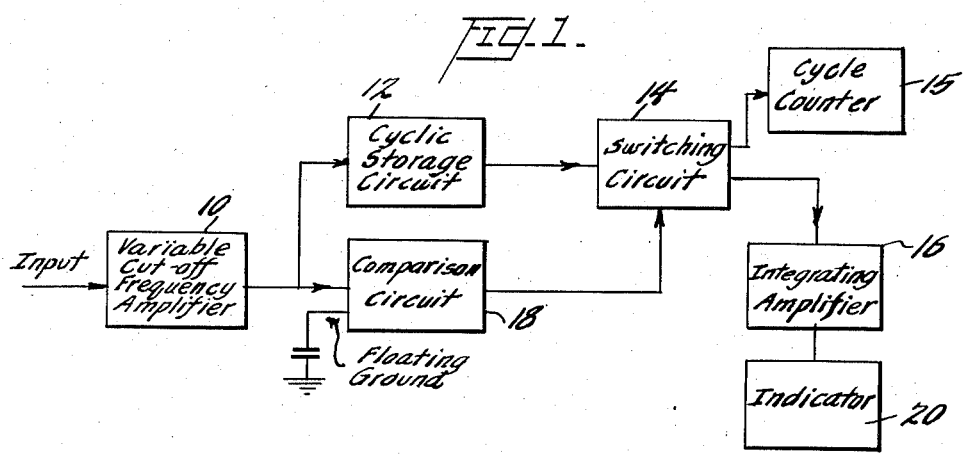
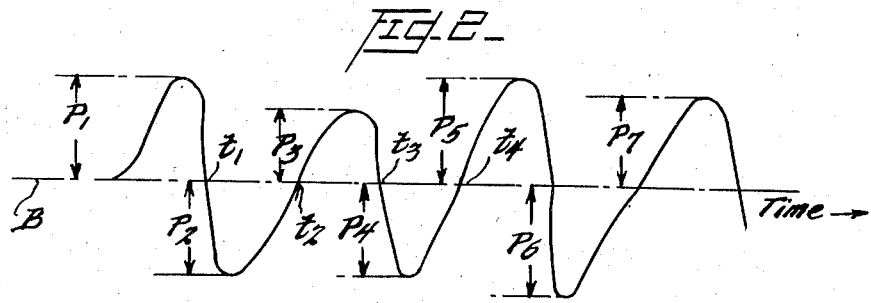
INVENTOR
Edward John Groth, Jr.,
BY Alvin Browdy
ATTORNEY May 6, 1958     E. J. GROTH, JR     2,833,469
TOTALIZER
Filed April 25, 1955     2 Sheets-Sheet 2

INVENTOR
Edward John Groth, Jr.,
BY Alvin Browdy
ATTORNEY

United States Patent Office 2,833,469
Patented May 6, 1958

2,833,469

TOTALIZER

Edward John Groth, Jr., Overland, Mo., assignor to Universal Match Corporation, Ferguson, Mo., a corporation of Delaware Application April 25, 1955, Serial No. 503,414

18 Claims. (Cl. 235—61)

This application relates to a totalizer and more particularly to a device for totalizing respiration.

In totalizing respiration of an animal it is necessary to ascertain the sum of the air respired within a predetermined period, for example, five minutes. In one prior art scheme for totalizing respiration a curve of the volume of air breathed in and out versus time is obtained from a recorder, and the peak positive and negative values of the respiration curve are totaled by actually measuring each of the peak ordinates on the curve and summing these ordinates without regard to algebraic sign. This process is quite tedious and time-consuming. The apparatus of the present invention totalizes respiration automatically. While the invention has its primary application in this field, it may be employed more generally in totalizing the successive ordinates of a curve, particularly where it is desired to add the successive peak ordinates of a quasi-sinusoidal signal curve without regard to algebraic sign.

Accordingly, it is a primary object of the invention to provide an improved totalizer.

Another object of the invention is to provide a unique device for totalizing the successive maximum and minimum ordinates of a signal.

A further object of the invention is to provide a system for summing the successive maximum and minimum ordinates of a quasi-sinusoidal signal without regard to algebraic sign.

An additional object of the invention is to provide a unique respiration totalizer.

Yet another object of the invention is to provide a measuring system wherein a signal is stored in a first storage means for a predetermined period and then transferred to a second storage means, which also receives the signal stored in the first means during successive periods.

Briefly, the invention comprises a cyclic storage means which stores an electrical charge proportional to the successive peak ordinates of an input signal, an integrating means for storing the charge transferred from the cyclic storage means periodically, a switching means for controlling the transfer from the cyclic storage means to the integrating means, a comparison means for comparing the input signal with a reference level for determining the correct instants to operate the switching means, and an indicator means for registering the total of the signal stored in the integrating means.

The foregoing and other objects of the invention will become more readily apparent in the following detailed description of the invention when taken in conjunction with the acompanying drawings, wherein:

Figure 1 is a block diagram of a preferred form of the invention;

Figure 2 is a graph of a typical curve which represents a signal to be totalized.

Figure 3:
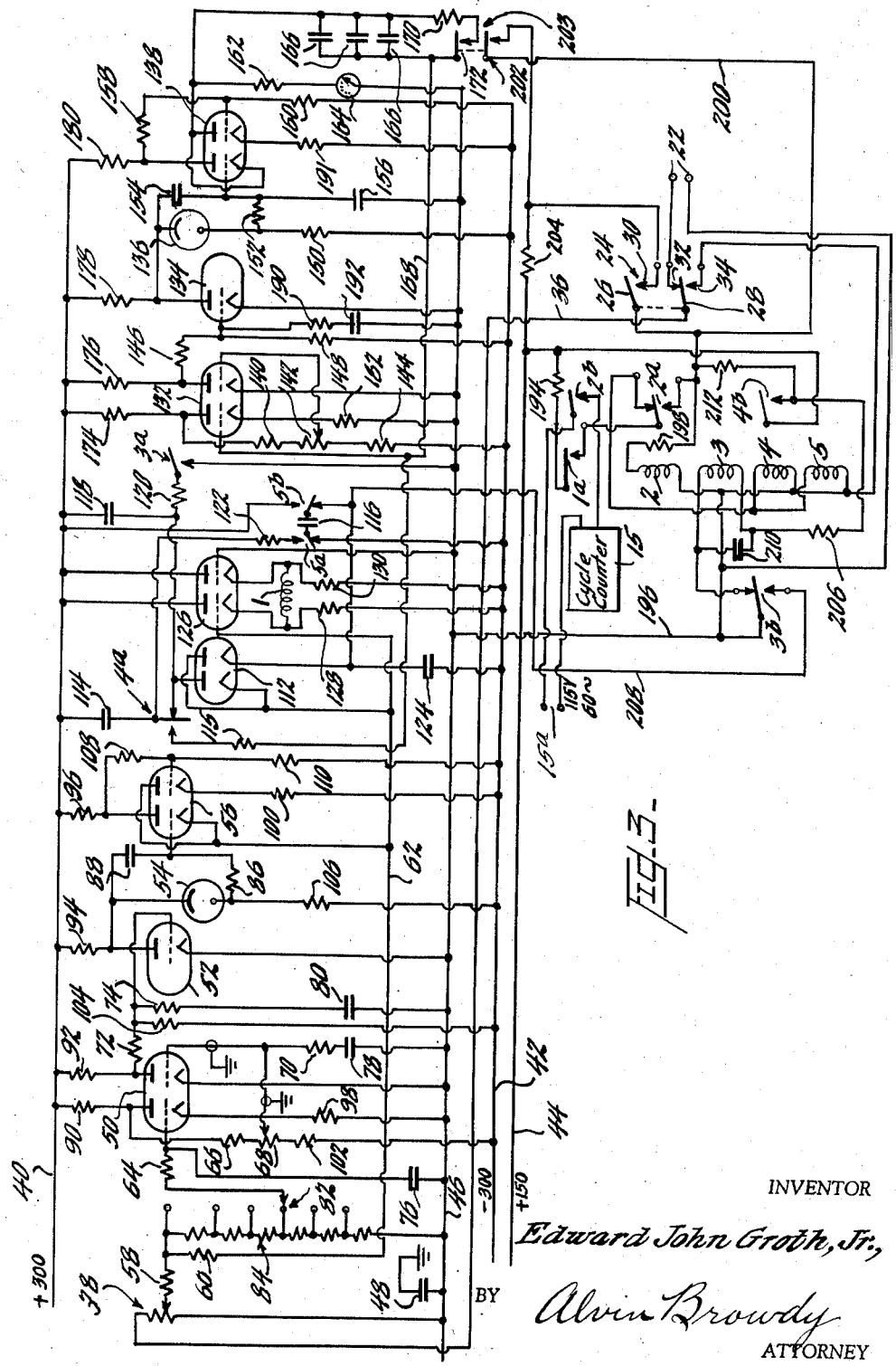
Figure 3 is a circuit diagram of a preferred form of the invention.

Referring to Figure 1, the signal at the input of the system, which may represent the instantaneous values of the volume of air breathed by an animal, is passed through an amplifier 10 which, by virtue of its variable feedback characteristics, serves as a variable cut-off low pass filter. The purpose of this amplifier is to filter the incoming signal to remove extraneous noise and small variations in the signal which are really not related to the breathing process, e. g., the heart beat. The signal is then applied to a cyclic storage circuit 12, which, as will appear more fully below, may comprise a pair of condensers charged through a pair of diodes in accordance with the peak positive and negative ordinates, respectively, of the input signal during one cycle. These two charges represent the maximum and minimum differential volumes encountered during that breathing cycle. Figure 2 illustrates a typical input signal having a series of successive peak ordinates $P_1$ through $P_7$ varying about a base line B. The positive ordinates would then be stored in one of the capacitors and the negative ordinates in the other.

At the end of a cycle, the charge stored in the two capacitors is transferred by means of a switching arrangement 14 to a large capacitor which may be in the feedback path of an integrating amplifier 16. The switching circuit is operated from a comparison circuit 18, which compares the level of the input signal from amplifier 10 with a reference level, which, in the example illustrated, is a floating ground level represented by base line B. As will become more apparent below, the switching circuit is operated to discharge the cyclic storage circuit at the end of each cycle. In this manner, the two capacitors in the cyclic storage circuit are completely discharged and are made available for data pertaining to the subsequent breathing cycle. The charges which they had accumulated are stored in the large capacitor in the integrating amplifier 16 and the total amount of charge stored by the integrating device is registered on an indicator 20. In order that the charges stored in circuit 12 will be totaled wtihout regard to sign, they must be applied to the integrating amplifier additively. This is accomplished, as will appear hereinafter, by the construction of the switching circuit. A cycle counter 15 may also be operated by the switching circuit so as to record the total number of breathing cycles in the test period. This counter may be of the conventional multi-wheel solenoid operated type.

Referring now to Figure 3, the input signal may be applied to the system at a pair of input terminals 22 and may be obtained from the recorder previously mentioned or from a strain gauge amplifier connected to a strain gauge which is attached to the subject. The input terminals are connected to a start and stop switch 24 having a pair of ganged switch arms 26, 28. Switch arm 26 is arranged to open and close a circuit with contact 30, while switch arm 28 is arranged to open and close circuits alternately with contacts 32 and 34. Switch arm 28 is connected through conductor 36 to a sensitivity control 38 at the input of the variable cut-off frequency amplifier. The sensitivity control may be a conventional rheostat with a variable tap.

Electric power for the system is provided by a pair of conventional power supplies (not shown) which supply plus and minus potentials with respect to a floating ground level. In the form illustrated, the power supplies provide positive 300 volts on conductor 40, negative 300 volts on conductor 42, and positive 150 volts on conductor 44, all with respect to the potential on a floating ground line 46. This line is preferably connected to the chassis of the apparatus through one or more condensers, such as condenser 48. The two 300 volt supplies should be very closely regulated, but the regulators may be quite conventional. The negative regulator may employ conventional gas regulator tubes and the positive regulator may utilize the negative supply as its standard. In this manner, variations of the negative supply will be reflected as similar variations in the positive supply. Of course, if the loop gain of the regulators is quite high, these variations will be quite small.

In the form illustrated the variable cut-off frequency amplifier comprises tubes 50, 52, 54, and 56. Tubes 50 and 56 may be dual triodes, for example, and tube 54 a gas regulator tube. The amplifier is of the feedback type and in the form shown as an output to input ratio of three. This ratio is determined by resistors 58 and 60, which have a ratio of one to three. Resistor 58 is connected to the variable tap of sensitivity control 38, while resistor 60 is connected to conductor 62, which provides a feedback path from the output to the input of the amplifier.

The cut-off frequency of the amplifier is varied by altering the internal loop gain, and by the use of proper internal phase shaping networks. These networks are constituted by resistors 64, 66, 68, 70, 72, and 74 in conjunction with capacitors 76, 78, and 80. The variation of the internal loop gain is accomplished by adjustment of the variable tap switch 82 in conjunction with the series string of resistors 84 connected in the input circuit of the amplifier.

The amplifier must operate in the extremely low frequency region of one or two cycles per second, and thus a D. C. path is provided from its input to its output. The signal at the variable tap of switch 82 as applied to the grid of the first triode section of tube 50 and is coupled from the plate of the first triode section to the grid of the second triode section. Resistor 68 in the coupling circuit may be variable as indicated so as to provide a zero adjustment. The plate of the second triode section of tube 50 is coupled to the grid of tube 52, and the signal from the plate of this tube is coupled to the grid of the first triode section of tube 56 through a coupling circuit including gas regulator tube 54 and a resistor capacitor network 86, 88. The signal is then coupled from the plate of the first triode section of tube 56 to the grid of the second triode section and from the plate of the latter section back to the input circuit through line 62. The cathode of the first triode section of tube 56 is also connected to this line, and since the cathode of the second triode section is connected to the minus 300 volt line, the two triode sections of tube 56 are connected in series between the plus 300 and minus 300 volt supplies. Resistors 90, 92, 94, and 96 are plate load resistors connecting the plates of the respective tubes to the plus 300 volt conductor 40; resistors 98 and 100 are cathode load resistors; while resistors 102, 104, 106, 108 and 110 form a part of the coupling circuits for the respective tubes. It will be noted that a voltage divider circuit exists between the plus 300 and minus 300 volt supplies for the plates of tubes 50, 52, and the first section of tube 56.

After the breathing signal has been amplified and smoothed by the input amplifier, it is passed to a double diode charging circuit which charges a pair of capacitors in such a manner that their charges represent the maximum and minimum values of the breathing signal during one complete breathing cycle. Reference numeral 112 designates the double diode charging tube, the cathode of one section and the plate of the other section being connected together and to conductor 62, which receives the output of the variable cut-off frequency amplifier, as described previously. Tube 112 is arranged to charge a capacitor 114 from the plus 300 volt line 40 and a capacitor 116 from the minus 300 volt line 42. Condenser 114 is connected to the switch arm of a single pole double throw switch 4a. In the position shown, switch 4a connects condenser 114 to the plate of one section of the diode 112, while in its alternate position switch 4a connects condenser 114 to the input of the integrating amplifier, as will appear more fully hereinafter. Another condenser 118 is permanently connected between the plus 300 volt line 40 and plate of the first diode section. This condenser is also connected through a resistor 120 to the arm of a single pole single throw switch 3a, which, when closed, connects the condenser to the floating ground line 46.

Condenser 116 is associated with a pair of single pole double throw switches 5a and 5b, which are adapted to be operated in unison. With these switches in the positions illustrated, condenser 116 is connected from the cathode of the second section of diode 112 to the minus 300 volt line 42. With the switches in their alternate positions, the condenser is connected from the plus 300 volt line 40 through a resistor 122 to the arm of switch 4a. Another condenser 124 is connected permanently between the cathode of the second diode section of tube 112 and the minus 300 volt line 42.

Tube 126, which may be a dual triode, forms a part of the comparison circuit. This tube is arranged as a dual cathode follower. Its plates are connected directly to the plus 300 volt line 40, and its cathodes are connected through load resistors 128 and 130 to the minus 300 volt line 42. The control grid of the first triode section of tube 126 is connected to line 62, i. e., the output of the variable cutoff frequency amplifier, and the control grid of the second triode section is connected to the floating ground line 46. A relay coil 1 of a polarized relay is connected directly across the cathodes of tube 126.

The integrating amplifier comprises tubes 132, 134, 136, and 138. Tubes 132 and 138 may be dual triodes as illustrated and tube 136 a gas regulator tube of the same type as tube 54 in the variable cut-off frequency amplifier. The input to the grid of the first triode section of tube 132 is obtained through resistor 115 from the switch arm of switch 4a when the latter is closed on its left contact. The signal at the plate of the first triode section of tube 132 is coupled through a resistor network comprising resistors 140, 142, and 144 to the grid of the second triode section. Resistor 142 may be variable to provide a zero adjustment. The plate of the second triode section of tube 132 is coupled through a resistor network comprising resistors 146 and 148 to the grid of tube 134 and the plate of this tube is coupled through a network comprising gas regulator tube 136, resistors 150 and 152, and condensers 154 and 156 to the grid of the first section of tube 138. The plate of this section is coupled through a network comprising resistors 158 and 160 to the grid of the second triode section of tube 138. The plate of the second triode section is connected through a resistor 162 to one terminal of an indicator 164, which may be a microammeter, the other terminal of which is connected to the floating ground line 46. The plate of the second section of tube 138 is also connected to a feedback circuit including condensers 166, and a conductor 168 connected to the grid of the first section of tube 132. Three condensers 166 have been connected in parallel to obtain the required storage capacity, but it will be apparent that one very large condenser or a plurality of smaller ones could be utilized. The feedback condensers are arranged to be discharged through a resistor 170 by a single pole single throw switch 172, which when closed, completes the discharge circuit.

The integrating amplifier includes plate load resistors 174, 176, 178, and 180, and cathode load resistors 182, 191. Resistor 190 and capacitor 192 are included in a phase shaping network, and the same is true of the previously described resistor 152 and condenser 156. These networks determine the phase characteristics of the amplifier. It will be noted that the integrating amplifier is generally similar to the variable cut-off frequency amplifier in its construction.

The switching circuit of Figure 1 includes the switches noted in the foregoing description, a plurality of additional switches, and a plurality of relay coils. These coils include relay coil 1 described in connection with the comparison tube 126 and relay coils 2, 3, 4, and 5. In practice, coil 3 is arranged to operate switch 3a described in connection with capacitor 118; coil 4 is arranged to operate switch 4a described in connection with capacitor 114; coil 5 is arranged to operate switches 5a and 5b described in connection with condenser 116; and coil 1 is arranged to operate a single pole single throw switch 1a the arm of which, it will be noted, is connected through a resistor 194 to the plus 150 volt line 44. Where necessary to clarify the circuit diagram, the switches have been separated from the associated operating coils.

Relay coil 2 operates a single pole double throw switch 2a, the arm of which is connected to the contact of switch 1a; relay coil 3 also operates a single pole double throw switch 3b, the arm of which is connected to the floating ground line; and relay coil 4 also operates a single pole single throw switch 4b, the arm of which is connected to the plus 150 volt line. Relay coil 2 also operates a single pole single throw switch 2b, which, when closed, energizes the cycle counter 15 from the 115 volt, 60 cycle supply at 15a. One end of relay coils 2, 4, and 5 is connected through conductor 196 to the floating ground line 46. The other end of relay coils 4 and 5 is connected to the upper terminal of switch 2a. The other end of relay coil 2 is connected through a resistor 198 to the lower contact of switch 2a, to switch arm 26 of the start-stop switch 24, and through conductor 200 to the arm of a single pole single throw switch 202, which is ganged to the previously described arm of switch 172. Switches 172 and 202, as will appear hereinafter, constitute a reset switch 203.

The lower contact 30 associated with switch arm 26 is connected to the plus 150 volt line 44, which may include a resistor 204. The lower contact 34 associated with switch arm 28 is connected through conductor 196 to the floating ground line 46. The contact of switch 4b is connected through a resistor 206 to one side of coil 3, the other side of this coil being connected to the upper contact of switch 3b. The lower contact of this switch is connected through conductor 208 to condenser 124. A condenser 210 may be connected across relay coil 3 to provide a time delay. The contact of switch 4b is also connected through a resistor 212 and resistor 198 to coil 2. The purposes of the various connections will become more apparent in the following description of the operation of the invention.

After the line power has been applied to the instrument and a warm up time of 10 to 15 minutes allowed, the integrating amplifier should be zeroed by adjusting resistor 142. The meter 164 will thereby be made to read zero. The breathing cycle counter 15 should also be zeroed. While the integrating amplifier is being zeroed, the reset switch 203 should be moved to its closed position. The sensitivity control 38 should be adjusted to its desired value, and the frequency control 82 should be set to a value corresponding to approximately two times the maximum expected breathing rate during the run that is to take place. In the case of monkeys, for example, with a normal breathing rate of once per second and with a maximum expected breathing rate of perhaps two per second, this control would be set to four cycles per second cut-off frequency. In the case of humans with a breathing rate of about one-half cycle per second and with a maximum instantaneous expected rate of about one cycle per second, the control should be set for a two cycle per second cut-off. These settings will ensure that the variable cut-off frequency amplifier will pass a sufficiently wide frequency band with a substantially uniform response. At the beginning of the test run the reset switch will be in the position illustrated as will the start and stop switch 24. With the switches in this position, the totalizer will count the breathing cycles and totalize the volume until switch 24 is moved to the stop and hold position at the end of the run. The total volume will be read on meter 164, the sensitivity of which depends upon the value of resistor 162. If in a very long test run the meter reaches its full scale before the end of the run, the reset switch may be momentarily closed so as to reset meter 164 to zero and then the run may be continued. To obtain the total volume for the entire run, the successive readings on the meter must be added at the end of the run. The detailed operation of the volume totalizing circuit will now be described.

Condensers 114 and 116 are the cyclic storage condensers which are periodically discharged to the input of the integrating amplifier, while condensers 118 and 124 are provided to prevent the circuit from drifting during the time that condensers 114 and 116 are discharged. At the beginning of a breathing cycle, $t_1$ in Figure 2, one terminal of each of the condensers will be at the floating ground potential. One terminal of condensers 114 and 118 is connected permanently to the plus 300 volt line, one terminal of condenser 124 is connected permanently to the minus 300 volt line, and at the beginning of the cycle one terminal of condenser 116 is connected to the minus 300 volt line. As the cycle proceeds toward $t_2$ into the negative region, the terminals of capacitors 114 and 118 which are connected to diode 112 will be pulled down from the base level B (the floating ground level) in accordance with the decrease in potential on line 62 at the output of the variable cut-off frequency amplifier. Condensers 114 and 118 will thus be charged to a potential greater than 300 volts by an amount corresponding to the minimum of the breathing cycle, or the peak value $P_2$ in Figure 2, and will maintain these charges temporarily. When $t_2$ is reached, the plate of the second half of the dual diode 112 will be pulled positively above the base level B and condensers 116 and 124 will be charged to a value greater than 300 volts by an amount corresponding to the maximum of the breathing cycle, or peak $P_3$ and will maintain these charges temporarily. When $t_3$ is reached, the comparison circuit including tube 126 initiates a sequence of switching operations. Polarized relay 1 is energized in one direction (after both sets of capacitors have received charges corresponding to the minimum and maximum of the breathing cycle as indicated above) when the breathing cycle signal crosses the base line in a negative going direction. The energization of relay coil 1 closes switch 1a and applies power to relay coils 4 and 5 from the plus 150 volt line 44 through the closed upper contact of switch 2a and through conductor 196 to the floating ground line 46. The energization of relay coils 4 and 5 causes them to transfer their contacts from the position illustrated. The transfer of switch 5b to its upper contact connects the terminal of capacitor 116 which was previously connected to diode 112 to the positive 300 volt line 40, while the transfer of switch 5a to its upper contact connects the terminal of capacitor 116 which was previously connected to the minus 300 volt supply to the arm of switch 4a. This effectively reverses the terminals of condenser 116 so that its charge difference from that corresponding to plus 300 volts may be measured in the same sense as the charge difference of condenser 114. The closure of relay 4 causes switch 4a to move to its left contact and connect condensers 114 and 116 to the input of the integrating amplifier. The closure of switch 4b applies power from the plus 150 volt line 44 to relays 2 and 3, the energization circuit for relay 2 being completed through conductor 196 to the floating ground line 46 and the energization circuit of relay 3 being completed through the upper contact of switch 3b to the same line. The application of power to relay 2 brings about its closure and locking through its switch 2a, which closes on its lower contact and completes a circuit through switch 1a to the plus 150 volt line 44. The closing of switch 2a on its lower contact opens its upper contact, however, thereby de-energizing relays 4 and 5. The constants of the circuits are arranged in such a manner that relays 4 and 5 stay closed for about 1/10 of a second. The closure of relay 2 also applies power to the breathing cycle counter 15 through switch 2b.

When relay 3 is energized, switch 3a is closed, thereby discharging condenser 118 to the floating ground line 46. Similarly the closing of switch 3b on its lower contact discharges condenser 124 to the floating ground line. Since relays 4 and 5 have been de-energized, switches 4a, 5a and 5b have returned to the positions illustrated, thereby reconnecting condensers 114 and 116 to the diode tube 112 and obviating the need for condensers 118 and 124, which are used to provide stability and to prevent the diodes from accumulating unspecified charges when they are disconnected from the measuring capacitors. Relay 3, by the inclusion of condenser 210, is provided with a short time delay so that it does not operate until after relays 4 and 5 have transferred all of their contacts. Relay 3 will reopen subsequent to the de-energization of relay 4 after a short delay. When the breathing cycle again crosses the base line at $t_4$, polarized relay 1 will open and release the locking contact at switch 2a for relay 2, this occurring one-half breathing cycle after the initiation of the relay operating sequence.

When the two measuring capacitors 114 and 116 are transferred to the input of the integrating amplifier, they are discharged to the input potential of this amplifier. This potential is adjusted so as to be negligibly different from the reference floating ground potential. The action of the integrating amplifier is to provide this reference potential and at the same time to permit the measuring charges to be transferred from the small capacitors 114, 116 and accumulated in the large capacitor constituted by elements 166, which is in the feedback path of the integrating amplifier. The transfer of the measuring charges and their accumulation by the large feedback capacitor permits a measurement of the total charge from the start of the run until any time the machine is stopped.

When it is desired to stop the run, the start-stop switch 24 may be placed in its stop and hold position, that is, the position alternate from that illustrated. This disconnects the signal from the input of the instrument and grounds the input circuit, since switch arm 28 is transferred from contact 32 to contact 34, and disables the charge transfer relay circuits. The latter is accomplished by the engagement of switch arm 26 with contact 30, which completes a circuit from the 150 volt line 44 to the coil of relay 2, causing relay 2 to be energized and preventing the energization of relays 4 and 5 through the upper contact of switch 2a (relay 3 is not energized, because resistors 206 and 212 prevent adequate pull-in current). Whatever charge has accumulated in the feedback capacitor will be indicated by meter 164, and the indication will remain for a considerable length of time (up to several days with negligible drift). If it is desired to reset the integrating amplifier for the start of a new run, the reset switch is momentarily closed. This operation discharges the feedback capacitor and returns the indicating meter to zero. A new run may be commenced by returning the start switch 24 to the position illustrated.

Typical components and component values for the circuit of Figure 3 are as follows:

Tubes

| Ref. No.: | Type |
|---|---|
| 50 | 12AY7 |
| 52 | 12AT7 |
| 54 | OA2 |
| 56 | 12AU7 |
| 112 | 6AL5 |
| 126 | 12AX7 |
| 132 | 12AX7 |
| 134 | 12AT7 |
| 136 | OA2 |
| 138 | 12AU7 |

Capacitors

| Ref. No.: | Capacitance in microfarads |
|---|---|
| 48 | .25 |
| 76 | 1.0 |
| 78 | .47 |
| 80 | .02 |
| 88 | .001 |
| 114 | .02 |
| 116 | .02 |
| 118 | .02 |
| 124 | .02 |
| 154 | .001 |
| 156 | .05 |
| 166 | 4.0 |
| 192 | .1 |
| 210 | .25 |

Resistors

| Ref. No.: | Resistance in ohms |
|---|---|
| 38 | 10K |
| 58 | 100K |
| 60 | 300K |
| 64 | 2.7M |
| 66 | 1.5M |
| 68 | 1M |
| 70 | 270K |
| 72 | 1.5M |
| 74 | 200K |
| 84 (downward in order) | 200K / 470K / 150K / 68K / 33K / 22K |
| 86 | 47K |
| 90 | 51K |
| 92 | 51K |
| 94 | 100K |
| 96 | 40K |
| 98 | 560 |
| 100 | 40K |
| 102 | 3M |
| 104 | 3M |
| 106 | 1M |
| 108 | 1M |
| 110 | 390K |
| 115 | 27K |
| 120 | 27K |
| 122 | 27K |
| 128 | 300K |
| 130 | 300K |
| 140 | 1.5M |
| 142 | 1M |
| 144 | 3M |
| 146 | 1.5M |
| 148 | 3M |
| 150 | 1M |
| 152 | 47K |
| 158 | 1M |
| 160 | 390K |
| 162 | 1M |
| 170 | 10K |
| 174 | 51K |
| 176 | 51K |
| 178 | 100K |
| 180 | 40K |
| 182 | 560 |
| 190 | 22K |
| 191 | 40K |
| 194 | 27K |
| 198 | 27K |
| 204 | 27K |
| 206 | 51K |
| 212 | 27K |

While a preferred form of the invention has been shown and described, it will be apparent to those skilled in the art that many modifications may be made in this embodiment without departing from the principles of the invention. This embodiment is, therefore, to be taken as illustrative of the invention rather than restrictive and any modifications that lie within the range of equivalents are intended to form a part of the invention as defined in the following claims:

What I claim as my invention is:

1. A system for measuring the sum of the peak values of a continuous incoming signal having successive peaks of opposite polarity, comprising first storage means, means for producing an electric charge in said first storage means in direct proportion to the values of said successive peaks of said signal without regard to polarity, second storage means, transfer means for periodically removing the charges in the first storage means and additively accumulating such charges in the second storage means, and indicator means responsive to the total charge stored in said second storage means.

2. A system in accordance with claim 1, said first storage means comprising a pair of storage elements, said electric charge producing means comprising means for charging one of said storage elements in direct proportion to signal peaks of one polarity and for charging the other of said storage elements in direct proportion to signal peaks of the opposite polarity.

3. A system in accordance with claim 1, including means for operating said transfer means once during each successive cycle of said signal.

4. A system in accordance with claim 1, said transfer means operating in response to a change from one of said polarities to the other which polarity change constitutes an end point in each successive cycle of the signal.

5. A system for measuring the sum of successive peak values of a signal which varies positively and negatively with respect to a base level, comprising first storage means, means for charging said first storage means in proportion to said peak values, second storage means, comparison means for detecting a change in polarity of said signal with respect to said base level, means operated by said comparison means for discharging said first storage means into said second storage means, and indicating means responsive to the total charge in said second storage means.

6. A system for measuring the sum of the successive peak values of a continuous incoming signal having successive peaks of opposite polarity which varies positively and negatively in succession with respect to a base level, comprising means for producing a first increment of potential in proportion to the value of each positive peak, means for producing a second increment of potential in proportion to the value of each negative peak, means for cumulatively adding a continuous series of such increments to produce a charge the value of which is equivalent to the sum of such increments, and means for indicating the value of the potential produced in accordance with the sum of said increments.

7. In a system of the type described, a source of continuous incoming signal having successive cycles consisting of peaks of positive and negative polarity with respect to a base level, a pair of condensers, means for charging one of said condensers in proportion to the positive peak of each cycle, means for charging the other of said condensers in proportion to the negative peak of each cycle, integrating means, and means for transferring the charges from said condensers to said integrating means at the end of each cycle.

8. In the system of claim 7, said charging means including a source of positive potential, a source of negative potential, and a pair of rectifiers, said source of positive potential being in series with one of said condensers and one of said rectifiers, said source of negative potential being in series with the other of said condensers and the other of said rectifiers, said charging means further including means for rendering said rectifiers conducting in response to negative and positive values of said signal, respectively.

9. In the system of claim 8, said rectifiers comprising electron tubes each having a cathode and an anode, the anode of one of said tubes being connected to the cathode of the other tube, the junction of the last-mentioned cathode and anode being connected to said signal source, and the remaining anode and cathode being connected to said condensers, respectively.

10. A respiration totalizer or the like for determining the total without regard to sign of the successive peak values of a signal representative of air respired or the like, comprising a variable cut-off frequency means responsive to said signal, a cyclic storage means coupled to the output of said variable cut-off frequency means for storing successive peak values of said signal, integrating means, switch means for rendering said integrating means responsive to said storage means to integrate the signal stored in said storage means without regard to sign, and indicator means responsive to the output of said integrating means.

11. A totalizer or the like in accordance with claim 10, further comprising comparison means responsive to the output of said cut-off frequency means and to a reference signal level for operating said switch means periodically.

12. A totalizer or the like in accordance with claim 11, further comprising cycle counter means responsive to said switch means for adding the number of cycles of said signal applied to said cyclic storage means.

13. A totalizer or the like in accordance with claim 10, said variable cut-off frequency means comprising an amplifier with a variable gain feedback circuit, said integrating means comprising an amplifier having a feedback loop containing a storage device.

14. A device of the type described for measuring the sum of the peak values of a signal without regard to polarity, comprising a first condenser, means for charging said first condenser in proportion to peaks of one polarity, a second condenser, means for charging said second condenser in proportion to peaks of the opposite polarity, a third condenser, charge transfer switch means for transferring the charge from said first and second condensers to said third condenser additively, start-stop switch means for rendering said charging means responsive to said signal and alternately nonresponsive to said signal while at the same time disabling said charge transfer switch means, and reset switch means for discharging said third condenser while at the same time disabling said charge transfer switch means.

15. A device in accordance with claim 14, said charge transfer switch means comprising relay means for connecting said first and second condensers to said charging means and said third condenser.

16. A device in accordance with claim 15, further including indicator means responsive to the charge stored in said third condenser.

17. A system for measuring the sum of the peak values of a signal comprising first storage means including a pair of storage elements, electric charge producing means for charging one of said storage elements in response to signal peaks of one polarity and for charging the other of said storage elements in response to signal peaks of the opposite polarity, second storage means, means for transferring periodically the charge from said first storage means to said second storage means, said transferring means including means for transferring the charges in said storage elements to said second storage means additively, and indicator means responsive to the total charge stored in said second storage means, whereby said indicator will indicate the sum of said peak values without regard to polarity.

18. In a system of the type described, a source of signal having values of positive and negative polarity with respect to a base level, a pair of condensers, means for charging one of said condensers in accordance with said positive values, means for charging the other of said condensers in accordance with said negative values, integrating means, means for transferring periodically the charge from said condensers to said integrating means, said transferring means comprising means for comparing the instantaneous value of said signal with a value representing said base level, and means responsive to said comparison means for discharging said condensers.

References Cited in the file of this patent

UNITED STATES PATENTS

| | | |
|---|---|---|
| 2,607,528 | McWhirter et al. | Aug. 19, 1952 |
| 2,789,761 | Merrill et al. | Apr. 23, 1957 |

OTHER REFERENCES

"Radar Electronics Fundamentals," Navships 900, 016, published by Bureau of Ships, Navy Dept., Washington, D. C., June 1944.